Inventor
John N. Wolfram
By Mason, Porter & Diller
Attorneys

Patented June 14, 1949

2,473,118

UNITED STATES PATENT OFFICE 2,473,118

COUPLING FOR TUBES

John N. Wolfram, Cleveland, Ohio, assignor to The Parker Appliance Company, Cleveland, Ohio, a corporation of Ohio Application June 30, 1944, Serial No. 542,856

1 Claim. (Cl. 285—87)

The invention relates to new and useful improvements in a coupling for tubes and more particularly for a tube which is flareless.

An object of the invention is to provide a coupling of the above type having a holding sleeve moved into gripping contact with the tube by a nut, with a limiting stop for preventing over-tightening with a resulting excess deformation or crushing of the tube wherein the limiting stop is so constructed as to yield under heavy torque pressure to take up any looseness between the sleeve and tube upon repeated assemblies of the coupling.

A further object of the invention is to provide a coupling of the above type wherein the gripping end of the holding sleeve makes sealing contact both with the body member of the coupling and tube which is secured to the coupling.

A still further object of the invention is to provide a coupling of the above type wherein said sleeve makes additional or secondary sealing contact with the body member of the coupling and tube when heavy torque pressure is applied to the nut.

These and other objects will in part be obvious and will in part be hereinafter more fully disclosed.

In the drawings which show by way of illustration one embodiment of the invention:

Figure 1:
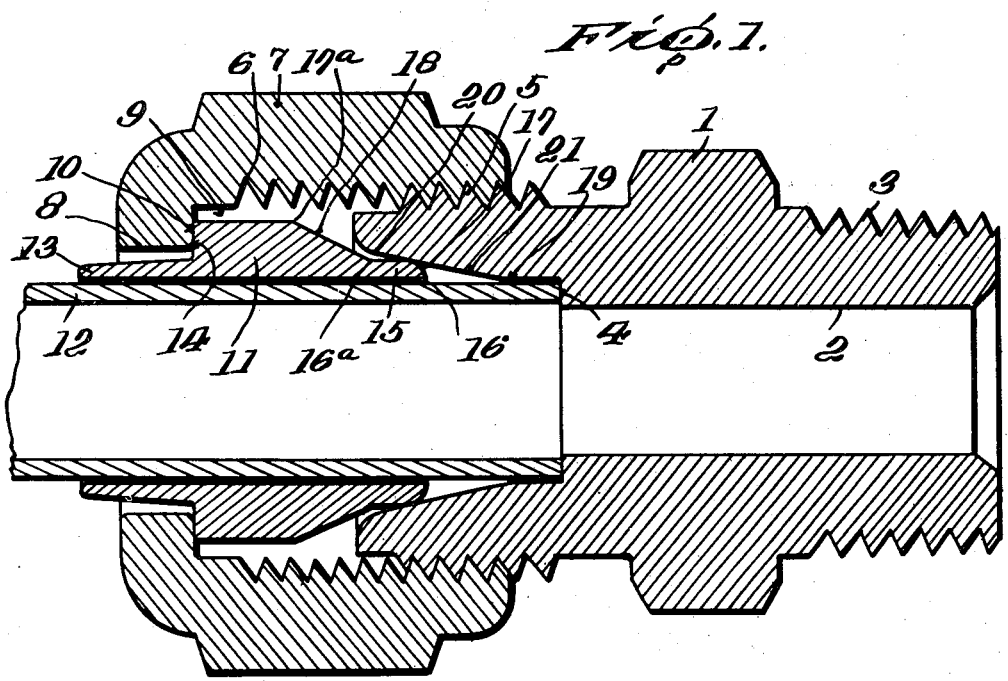
Figure 1 is an enlarged sectional view longitudinally through the coupling with a tube in place ready to be secured to the coupling member.

The coupling as illustrated in the drawing includes a body member 1 having a bore 2 of substantially the same diameter as the tube which is to be secured to the coupling. Said body member 1 is provided with a threaded section 3 adapted to be attached to any part at which the tube is to be connected. The body member 1 is counterbored so as to provide a seat 4 for the end of the tube. As shown in the drawings, this seat 4 is substantially at right angles to the wall of the bore. It will be understood, however, that the seat may be otherwise shaped, the essential feature being that it shall provide a means for positioning a tube in the coupling. It is also desirable when the seat is used that it shall be so constructed that it will prevent endwise movement of the tube when it is gripped and secured to the coupling. It will be understood, however, that under certain conditions hereinafter referred to more in detail, the seat for the tube may be done away with.

The body member 1 is provided with the threaded section 5 adapted to cooperate with the threaded section 6 of a nut 7. It will be understood that while this threaded section on the body member is arranged on the exterior surface thereof that the threaded connection between the nut and body member may be otherwise constructed, it being essential that there shall be a connection which will cause the nut to move onto the body member when it is turned. Said nut at its outer end has an inwardly extending portion 8 providing a recess 9 and a shoulder 10.

Disposed within the recess 9 of the nut is a holding sleeve 11. This holding sleeve fits over the tube which is to be clamped to the coupling with a loose tolerance. The tube is indicated at 12 in the drawings, with the end thereof in engagement with the seat 4. The sleeve is provided with a projecting portion 13 at its rear end which extends outwardly beyond the nut, the nut having a sufficient opening so that it is free from contact with this projecting portion of the sleeve. This projecting portion serves to dampen vibrations in the tube.

The sleeve is provided with a shoulder 14 which is adapted to be contacted with by the shoulder 10. The sleeve at its inner end is cut away so as to provide a relatively thin cylindrical portion 15. The end of the sleeve is substantially at right angles to the wall of the bore through the sleeve, thus providing a relatively sharp edge 16. The outer face of the end sleeve is rounded as indicated at 17. The sleeve as illustrated in the drawings tapers from the point 16a which might be called the base of the cylindrical portion 15 to a point 17a. This provides an inclined surface 18.

The body member 1 within the bore is tapered from a point 19 to a point 20 and from the point 20 to the end of the body member 21 the surface is rounded. The tapered surface between the points 19 and 20 is a camming surface and also a sealing surface. This camming surface is indicated at 21. The rounded portion between the points 20 and 21 is initially spaced away from the inclined surface 18.

Figure 2:
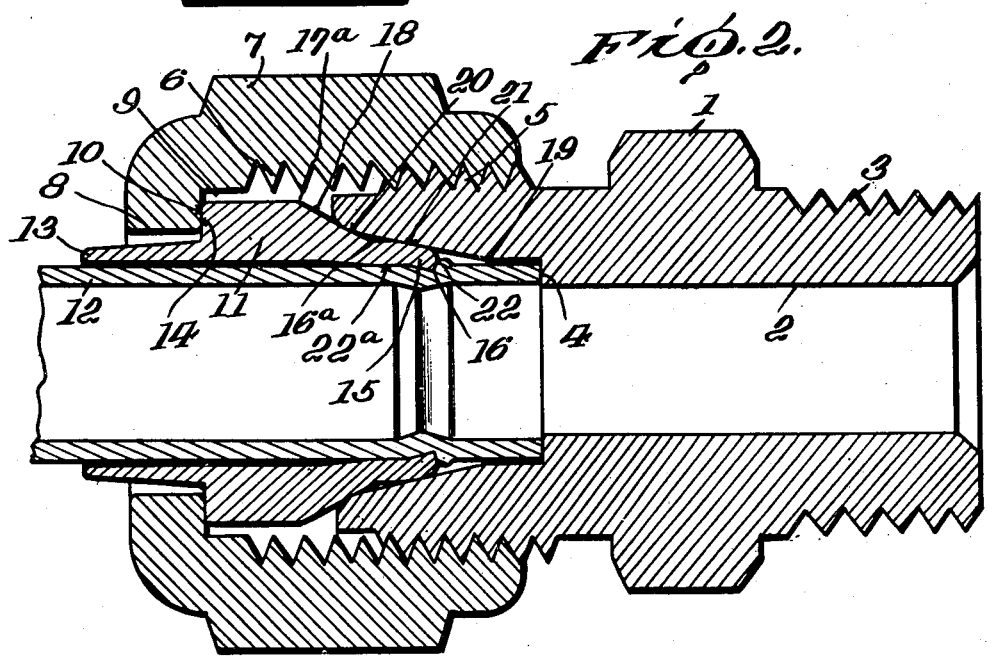
Figure 2 is a similar view but showing the coupling closed and the tube firmly gripped and secured to the coupling.

After the tube has been placed in the coupling and in contact with the seat 4 then the nut is threaded onto the body member. The shoulder 10 of the nut contacting with the shoulder 14 of the sleeve will force the sleeve endwise on the tube. This will cause the rounded end 17 of the sleeve to contact with the camming surface 21 and as the sleeve is forced against this camming surface, the extreme inner end of the sleeve will be contracted and will cause the sharp cutting edge 16 to cut into the tube wall rolling up a shoulder 22 in the tube 12, as shown in Figure 2. This may cause a slight inward bulging of the inner wall of the tube, but not sufficient to damage the tube or restrict the flow passage through the tube. At the same time that the sharp shoulder 16 becomes embedded in the tube wall, it provides a seal between the tube and the sleeve. Likewise the contact between the rounded end 17 of the sleeve and the camming surface 21 of the body member provides a sealing line between the sleeve and the body member. This is the main seal between the coupling and tube.

In order to prevent over-tightening of the coupling, the rounded surface 20 on the body member 1 is spaced away from the inclined surface 18 so that these parts do not contact until the sleeve has been forced into firm gripping contact with the tube. As shown in Figure 2, these parts have been brought into contact and when they contact they provide a limiting stop which will prevent over-tightening of the coupling with the resulting excess deformation or crushing of the tube.

There are, however, times when a looseness develops between the sleeve and the tube particularly when the coupling parts are separated and re-assembled. There are other times when looseness develops due to vibration of the tube or impulse forces applied to the tube. In order to take care of the situation such as just stated, the limited stop is of a yieldable character. If heavy torque pressure is applied to the nut, the curved portion 20 of the body member reacting upon the inclined portion 18 of the sleeve will contact the sleeve moving it into tighter contact with the tube and permitting further endwise movement of the sleeve so as to take up this looseness which has developed. When the sleeve is further contracted, it produces a secondary or auxiliary seal between the sleeve and the tube in the region indicated at 22a. The contact between the rounded portion 20 and the inclined portion 18 will provide a further secondary or auxiliary seal for the coupling.

It will be noted that the camming surface 21 is at a relatively small angle to the wall of the bore, while the rounded surface 20 is at a much larger angle. Therefore, when the rounded surface 20 contacts with the inclined surface 18, the excess torque necesary to turn the nut will warn the operator that the tube is firmly gripped and further turning of the nut would result in over-tightening of the coupling. While this limiting stop insures a proper tightness of the coupling and prevents any resulting excessive deformation or crushing of the tube, it still has sufficient yielding qualities to permit the sleeve being forced endwise when heavy torque pressure is applied to take up any looseness between the sleeve and the tube which may result upon repeated assemblies of the coupling or which may result from excessive vibrations of the tube after it is clamped to the coupling.

While the body member is shown as rounded for contact with the inclined face 18, it will be understood that these contacting faces may be otherwise shaped. It is essential, however, that when they are brought into contact the coupling shall be closed and the tube firmly gripped so as to prevent over-tightening of the coupling and at the same time to permit yielding under heavy torque pressure to take up this looseness above referred to.

It is obvious that many changes in the details of construction may be made without departing from the spirit of the invention as set forth in the appended claim.

I claim:

A coupling for tubes comprising a body member having a bore adapted to receive the end of a flareless tube, a nut having threaded engagement with said body member, a sleeve interposed between the nut and the body member, said body member being shaped within the bore to provide a camming surface having a gradual taper, said sleeve at the inner end thereof having a reduced portion of a substantially uniform diameter, which diameter is greater than the diameter of the inner end of the camming surface, and less than the diameter of the outer end of the camming surface so that the inner end of the sleeve will be forced by the nut into engagement with the camming surface and will be contracted and caused to cut into the tube and grip the same, said sleeve having an outwardly abruptly tapering surface at the outer end of the reduced portion so that when the sleeve has been moved along the camming surface into firm gripping engagement with the tube, said abruptly tapered portion will contact with the body member at a point spaced outwardly from said reduced portion for limiting further endwise movement of the sleeve under normal wrench pressure.

JOHN N. WOLFRAM.

REFERENCES CITED

The following references are ot record in the file of this patent:

UNITED STATES PATENTS

| Number | Name | Date |
|---|---|---|
| 1,866,914 | Stover | July 12, 1932 |
| 2,182,811 | Kocher | Dec. 12, 1939 |